United States Patent [19]
Lamouroux et al.

[11] Patent Number: 6,068,930
[45] Date of Patent: May 30, 2000

[54] HIGH-TEMPERATURE COMPOSITE MATERIALS WITH CARBON OR CARBON-COATED FIBRE REINFORCEMENTS AND ENHANCED OXIDATION RESISTANCE

[75] Inventors: Frank Lamouroux, Villefontaine; René Pailler, Cestas; Roger Naslain, Pessac; Michel Cataldi, Villenave d'Ornon, all of France

[73] Assignee: Societe Nationale d'Etude et de Construction de Moteurs d'Aviation, Paris, France

[21] Appl. No.: 09/091,274

[22] PCT Filed: Dec. 6, 1996

[86] PCT No.: PCT/FR96/01951

§ 371 Date: Jun. 12, 1998

§ 102(e) Date: Jun. 12, 1998

[87] PCT Pub. No.: WO97/21645

PCT Pub. Date: Jun. 19, 1997

[30]       Foreign Application Priority Data

Dec. 14, 1995  [FR]  France ................................... 95 14843

[51] Int. Cl.⁷ ..................................................... C23C 16/00
[52] U.S. Cl. .......................... 428/467; 428/368; 428/378; 428/388; 428/698; 428/902; 428/903; 427/248.1; 427/249; 427/255.12; 427/419.2; 264/29.1; 264/29.7; 264/638; 264/642
[58] Field of Search ................................. 264/29.1, 29.7, 264/638, 642; 427/248.1, 249, 255.12, 419.2, 419.7, 907; 428/367, 368, 378, 388, 408, 698, 902, 903

[56]                References Cited

U.S. PATENT DOCUMENTS 5,552,220   9/1996   Goujard et al. .......................... 428/367

FOREIGN PATENT DOCUMENTS 385869   9/1990   European Pat. Off. .
483009   4/1992   European Pat. Off. .
672637   9/1995   European Pat. Off. .

OTHER PUBLICATIONS

Droillard, C. et al, "Fracture Toughness of 2–D Woven SiC/SiC CVI–Composites with Multilayered Interphases", Journal of the American Ceramic Society, Apr. 1996.

Vandenbulke, L. et al, "Silicon and Boron Containing Components by CVD and CVI for High Temperature Ceramic Composites", Journal De Physique IV (Colloque), Jun. 1995, France.

*Primary Examiner*—Richard Weisberger
*Attorney, Agent, or Firm*—Weingarten, Schurgin, Gagnebin & Hayes LLP

[57]                ABSTRACT

The matrix of the composite material is made in sequenced manner by chemical vapor infiltration within fiber reinforcement. Each elementary sequence of the matrix comprises a relatively flexible layer and a relatively rigid ceramic layer, and the sequences are of thicknesses that increase going away from the reinforcing fibers, with the thickness at least of the first-deposited sequence being selected to be sufficiently small for the fibers to be coated in essentially individual manner. The flexible layers are made of an anisotropic material having sufficient capacity for elastic deformation in shear and transversely, and although a mainly ceramic character is conserved for the matrix, the thickness of the flexible layers is nevertheless selected to be sufficiently large to be capable of absorbing differential expansion of the components of the composite material while it is being made without inducing the existence of an initial network of cracks.

27 Claims, 4 Drawing Sheets

HIGH-TEMPERATURE COMPOSITE MATERIALS WITH CARBON OR CARBON-COATED FIBRE REINFORCEMENTS AND ENHANCED OXIDATION RESISTANCE

The present invention seeks to improve the ability of thermostructural composite materials having carbon or carbon-coated fiber reinforcement to withstand oxidation.

Thermostructural composite materials are materials comprising fiber reinforcement known as a fiber "preform" in which the fibers are made of a refractory material such as carbon or ceramic, and a matrix that fills in, at least in part, the pores initially present in the fiber reinforcement. Such materials are remarkable for their mechanical properties, enabling them to be used as structural elements, and for their ability to conserve these properties at high temperatures, in particular when the matrix is made of ceramic.

In general, the ceramic matrix of such composite materials is subject to cracking. The presence of cracks can already be observed when the material is made, particularly when the matrix is subjected to thermal stresses because it is obtained by chemical vapor infiltration or by impregnation by means of a precursor liquid with the precursor then being transformed into the ceramic by heat treatment. These initial cracks subsequently multiply under the effect of thermo-mechanical stresses encountered while the material is in use. Nevertheless, because of the presence of the fiber reinforcement, the material-damaging effects of the matrix cracking do not immediately affect its integrity, thus ensuring the thermostructural characteristics of the material.

Thermostructural composite materials find applications in various fields where use is made of their ability to withstand high mechanical stresses at high temperature, particularly in the fields of aviation, space, and braking. In use, these materials are usually exposed to an external environment that is oxidizing, in particular to ambient air.

When the reinforcing fibers are made of an oxidizable material, such as carbon, the combination of a network of cracks in the matrix, an oxidizing environment, and high temperature leads inevitably to the fibers being destroyed and consequently to the mechanical properties of the material collapsing.

A similar problem is encountered when the carbon is present in the material, not as the reinforcing fibers themselves, but as an interphase between ceramic fibers and a ceramic matrix. The making of such a pyrolytic carbon interphase and its usefulness in improving the mechanical behavior of the material are well known in the state of the art. Reference can be made in particular to the Applicant's document EP-A-0 172 082.

In order to improve the ability of a carbon-containing composite material to withstand oxidation, proposals have been made to provide the material with a surface coating that forms a barrier against the oxygen in the ambient medium and that is capable of plugging the cracks as they appear in the matrix of the composite material or in the coating itself. To this end, the protective coating comprises at least one self-healing layer, generally a vitreous layer which, by means of the glass passing to a semisolid state, enables cracks to be plugged at temperatures about the melting point of the glass.

That solution suffers from several drawbacks. Firstly, the self-healing effect can be obtained in satisfactory manner only over a limited temperature range. At lower temperatures, the viscosity of the glass is too high, while at higher temperatures its viscosity becomes too low and the self-healing composition runs the risk of being damaged by friction, shear, or indeed blast, i.e. by being exposed to a strong flow of gas.

Another known solution consists in making a sequenced matrix, with the matrix being built up in layers of material alternating between relatively rigid layers of high stiffness, in particular a ceramic material, and relatively flexible layers of low stiffness in shear, in particular pyrolytic carbon of the rough laminar type, or boron nitride. One such solution is described, in particular, in the Applicant's document EP-A-0 385 869. The sequenced matrix has the effect of complicating the way in which cracks propagate, and consequently of slowing down the diffusion of oxygen within the material.

With that other solution, oxidation of carbon or carbon-coated fiber reinforcement is merely slowed down. There is no way in which initial cracking within the rigid layers can be avoided, and sooner or later the cracks propagate to the fibers depending on the thermo-mechanical stresses to which the material is exposed.

An object of the present invention is to remedy the drawbacks of the prior art methods.

More particularly, an object of the invention is to improve the ability of a ceramic matrix thermostructural composite material having carbon or carbon-coated fiber reinforcement to withstand oxidation by sequencing the matrix so that cracking of the matrix can be retarded as much as possible.

This object is achieved by a method of the type in which a matrix is formed by chemical vapor infiltration within the fiber reinforcement at least in part in a sequenced manner, alternating formation of a layer of a relatively flexible material capable of deflecting any cracks reaching it, and a layer of a relatively rigid ceramic material, in which method:

each elementary sequence of the matrix comprising a relatively flexible layer and a relatively rigid ceramic layer is formed with a thickness that increases starting from the reinforcing fibers as preparation of the matrix progresses, with the total thickness of at least the elementary matrix sequence deposited first on the fibers being selected to be sufficiently small to cover the fibers in essentially individual manner; and the relatively flexible layers are made of one or more anisotropic materials having sufficient capacity for elastic deformation in shear and transversely, and, while conserving a mainly ceramic character for the matrix, the thickness of the relatively flexible elementary layers is selected to be large enough for them to be capable of absorbing differential expansion of the components of the material while it is being made, without inducing therein the existence of an initial network of cracks.

The method of the invention is remarkable in that by an appropriate selection of sequencing characteristics for the matrix, it is possible to make a thermostructural composite material having a matrix that is mainly ceramic, but which, when the composite material is made, is free from any initial cracking.

This result is obtained by combining the following:

at least the first elementary sequence is made with a thickness that is small enough to be able to cover the fibers in essentially individual manner, e.g. using a thickness that preferably lies in the range 0.2 microns to 1 micron. Because the fibers are covered in concentric layers, differential expansion is absorbed in the vicinity of the fibers by the capacity for elastic deformation in a transverse direction, i.e. a radial direction, of the relatively flexible layer(s) disposed concentrically around each fiber, without giving rise to cracking in the adjacent and relatively rigid ceramic layers. In addition, a result of the fibers being covered individually is that covered fibers are formed having an apparent diameter greater than the diameter of the initial reinforcing fibers but which, within the composite material, behave mechanically in the same manner as non-covered reinforcing fibers. This increase in fiber diameter thus makes it possible to start with fiber reinforcement made up of smaller diameter fibers and/or having a smaller fiber volume fraction;

the relatively flexible layers are made of one or more materials presenting an anisotropic character and an ability to deform elasticity in shear transversely relative to the layers. Such materials are selected, for example, from pyrolytic carbon, in particular pyrolytic carbon of the rough laminar type, boron nitride, boron-doped carbon, and other materials having equivalent properties and capable of being built up by chemical vapor infiltration. Advantageously, the material(s) of the relatively flexible layers can be selected from materials, such as glass, that are suitable for constituting a self-healing compound, under the effect of oxidation. As a result, when the composite material matrix begins to crack under the effect of intense thermomechanical stress, the ability of the relatively flexible layers to deflect the cracks is accompanied by the ability of the cracks to heal themselves, thereby opposing even more effectively any penetration of oxygen from the ambient medium to the fibers; and the relatively flexible layers are selected to be sufficiently thick while ensuring that the matrix as a whole retains a mainly ceramic character, the total thickness of the relatively flexible layers representing, for example, about 4% to about 20% of the total thickness of the layers forming the sequenced matrix. In the elementary sequences, the percentage S represented by the thickness of the relatively flexible layer compared with the total thickness of the sequence can decrease from a maximum value Smax in the elementary sequence formed initially on the fibers to a minimum value Smin in the last-formed elementary matrix sequence. By way of example, the value Smax may lie in the range about 10% to about 35%, while the value Smin may lie in the range about 3% to about 20%, for example.

In addition to initial cracking being absent in the matrix of the composite material, the particular sequencing adopted, and specifically the distribution and the relative thicknesses of the relatively flexible layers, can have the effect that when the composite material is exposed to thermomechanical stresses, the behavior initially observed is not damaging, which means that it is possible to obtain a material in which deformation is of the elastic linear type up to a certain stress threshold. Above the threshold, behavior reverts to progressive cracking of the ceramic layers, i.e. it lies outside the elastic linear range, but the capacity of the relatively flexible layers to deflect and possibly heal cracks further retards the risk of the carbon constituting the fibers or the fiber coating being exposed directly to oxygen.

The layers of relatively rigid ceramic material forming a portion of the matrix can be made of the same ceramic material or of a plurality of different ceramic materials. The ceramic material(s) can be selected from carbides, borides, and silicides, e.g. from boron carbide $B_{13}C_2$ and silicon carbide SiC.

Preferably, each layer of the matrix is formed by chemical vapor infiltration in pulsed mode, i.e. by a succession of cycles leading to elementary deposits. As known per se, chemical vapor infiltration in pulsed mode makes it possible to obtain precise control over the microstructure of the deposits formed.

Particular implementations of the invention are described below by way of indication. Reference is made to the accompanying figures, in which.

In the examples given below of implementations of a method of the invention, the fiber reinforcement used is constituted by "T300" type carbon fiber roving sold by the Japanese company Toray Industries, with each piece of roving having about 3000 elementary fibers.

The fiber reinforcement is densified by a matrix which is made by repeating two successive sequences $BC/B_{13}C_2$ and BC/SiC, i.e. a first sequence comprising:

forming a relatively flexible layer of boron-doped carbon BC; and forming a relatively rigid layer of rhombohedral boron carbide of the $B_{13}C_2$ type;

followed by a second sequence comprising:

forming a relatively flexible layer of boron-doped carbon BC; and forming a relatively rigid layer of silicon carbide SiC.

Each layer of each sequence is formed by chemical vapor infiltration in pulsed mode. To this end, the fiber reinforcement is placed in an enclosure where predetermined temperature and pressure conditions are established. A volume of the reaction gas giving the desired deposit is admitted into the enclosure and it remains therein for a predetermined length of time, after which the gaseous species are evacuated from the enclosure and a new volume of gas is inserted. The cycle comprising inserting gas into the enclosure, allowing the gas to remain inside the enclosure, and evacuating the gaseous species from the enclosure is repeated as often as necessary to achieve the desired thickness of deposit.

To form a layer of boron-doped carbon, the reaction gas used comprises a mixture of boron trichloride $BCl_3$, of propane $C_3H_8$, and of hydrogen gas $H_2$. Pulsed mode infiltration conditions were as follows:

T=900° C.

P=3 kPa $\alpha(BCl_3)$=16.6

$\alpha(C_3H_8)$=3.6

$D_P$=5 s $K_D$≈0.3 nm in which:

T is the temperature inside the infiltration enclosure;

P is the total pressure inside the infiltration enclosure;

$\alpha(BCl_3)$ is the ratio of the flow rates of $H_2$ to $BCl_3$;

$\alpha(C_3H_8)$ is the ratio of the flow rates of $H_2$ to $C_3H_8$;

$D_P$ is the length of time during which the gas remains in each cycle; and $K_D$ is the thickness of the elementary deposit formed during each cycle.

To characterize the deposit obtained under such conditions, a relatively thick layer was formed on a sample of fibers. Optical microscope observation showed up the anisotropic character of the deposit corresponding to a smooth laminar type structure conferring relatively flexible behavior and the ability to deflect cracks because of its capacity for elastic deformation in shear and in a transverse direction relative to the layer. The chemical composition of the deposit, as measured using an X-ray microprobe, was 12 atom % boron for 88 atom % carbon.

To form a layer of boron carbide, a reactive gas was used comprising boron trichloride $BCl_3$, hydrogen gas $H_2$, and methane $CH_4$ as reaction species. Pulsed mode infiltration conditions were as follows:

T=900° C.

P=5.5 kPa $\alpha(BCl_3)$=3.7

$\alpha(C_3H_8)$=13

$D_P$=2 s $K_D$≈0.3 nm

Characterization of the deposit formed by a relatively thick layer on a sample of fibers thus indeed showed a composition close to rhombohedral $B_{13}C_2$, however the X-ray diffraction spectrum revealed an amorphous deposit.

To form a layer of silicon carbide, a gas was used comprising methyltrichlorosilane (MTS) and hydrogen gas H2 as reactive species. Pulsed mode infiltration conditions were as follows:

T=900° C.

P=3 kPa $\alpha(MTS)$=6

$D_P$=2 s $K_D$≈1 nm

Morphological analysis of the deposit formed on a sample showed that the surface was smooth, X-ray microprobe analysis gave 52 atom % carbon and 48 atom % silicon. The X-ray diffraction spectrum showed a small degree of crystallization.

EXAMPLE 1

150 mm long fiber reinforcement roving was densified with a matrix constituted by repeating the BC/$B_{13}C_2$/BC/SiC pair of sequences under the conditions specified above. The volume fraction of the fibers in the initial roving was 24% (percentage of the apparent volume of the roving actually occupied by the fibers).

The first two double sequences were implemented in which the BC layers were 0.1 µm thick, the $B_{13}C_2$ layer was 0.4 µm thick, and the SiC layer was 0.4 µm thick, giving a total thickness of 1 µm per double sequence.

A third double sequence was made in which the deflecting layers of BC were 0.2 µm thick, the $B_{13}C_2$ layer was 2 µm, and the SiC layer was 2 µm thick, giving a total thickness of 4.4 µm.

Finally, a fourth double sequence was made in which the deflecting layers of BC were 0.2 µm thick, the $B_{13}C_2$ layer was 3 µm thick, and the SiC layer was 3 µm thick, giving a total thickness of 6.4 µm.

In the composite materials obtained in this way, the total thickness of the relatively flexible layers of BC was therefore equal to 1.2 µm.

Figure 1:
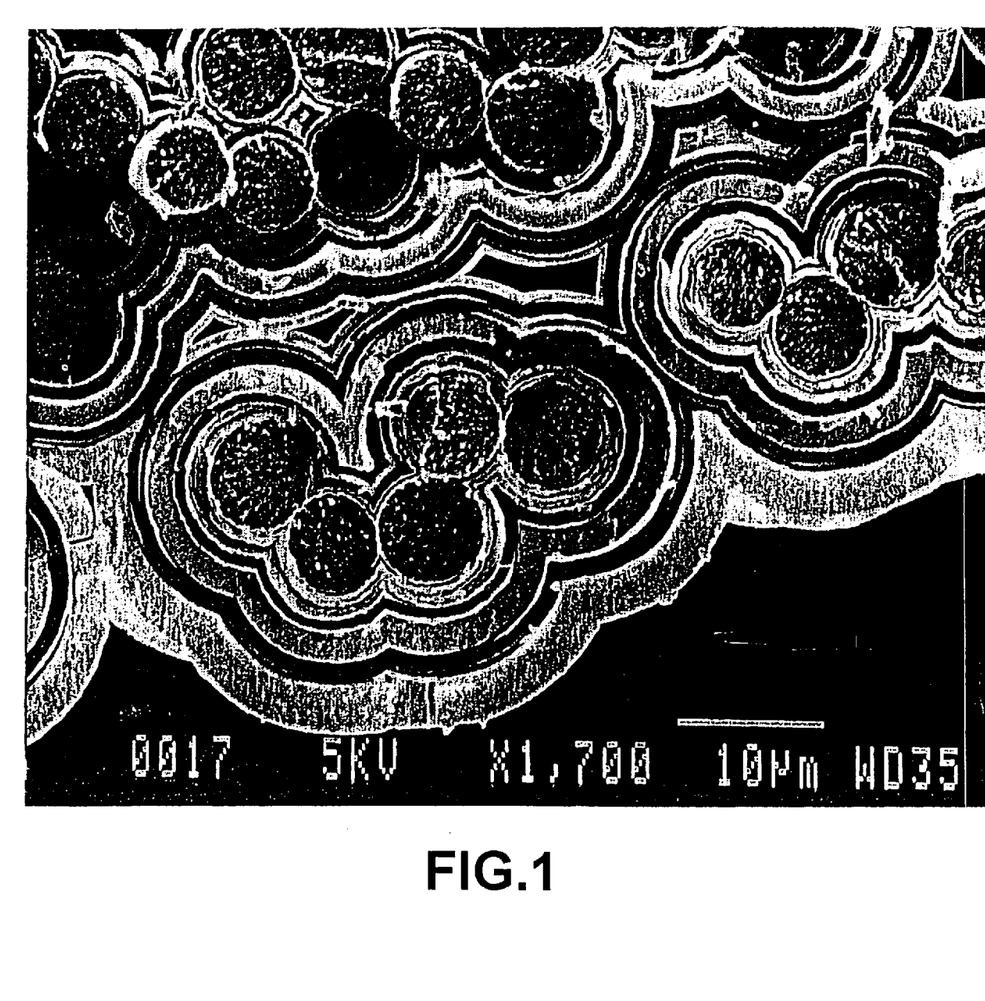
FIG. 1 is a picture obtained by a scanning electron microscope showing a bundle of carbon fibers densified by a matrix sequenced by a method of the invention.

FIG. 1 is a scanning electron micrograph of a section of material densified by the sequenced matrix. The carbon fibers are individually coated by layers formed during the first two sequences, except for the zones of contact between the fibers, said layers being deposited concentrically around the fibers. The layers formed during the third infiltration sequence envelop groups of fibers, while the layers formed during the fourth infiltration sequence practically surround the entire fiber roving. Observation by microscope shows, remarkably, that no initial cracking is present in the matrix.

Figure 2A:
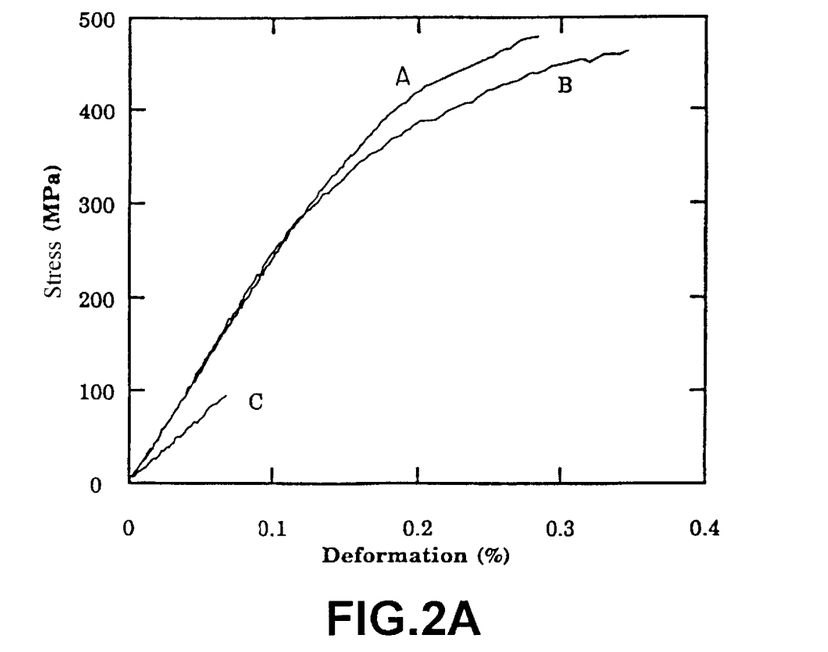
FIGS. 2A and 2B are traction curves at ambient temperature showing the relationship to rupture between measured deformation and applied traction stress, respectively for composite materials having a prior art monolithic matrix and for composite materials having a sequenced matrix of the invention.

A first traction test was performed at ambient temperature on roving densified by the sequenced matrix. Curve B in FIG. 2A shows the measured relative elongation (in %) as a function of the traction force exerted, up to rupture which took place at about 460 MPa.

Figure 3A:
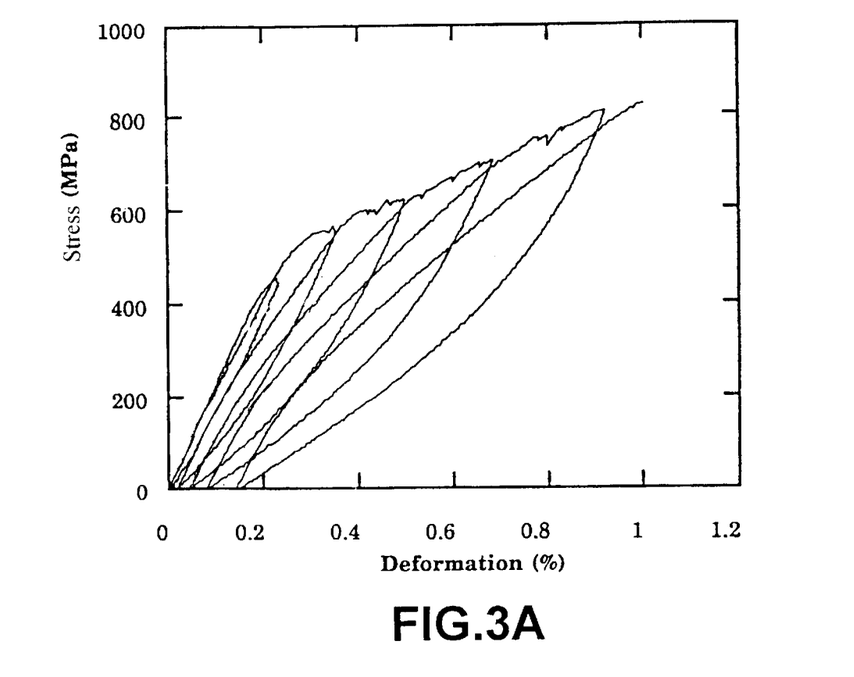
FIGS. 3A and 3B are curves showing the hot traction behavior respectively for prior art monolithic composite materials and for sequenced matrix composite materials of the invention.

A second traction test was performed at 700° C. in air after applying an outer coating constituted by $P_2O_5$ type glass for the purpose of providing protection against oxidation while the test was taking place. The curves B in FIG. 3A show the relationships between elongation and stress during a plurality of stretch-and-relax cycles.

Figure 4:
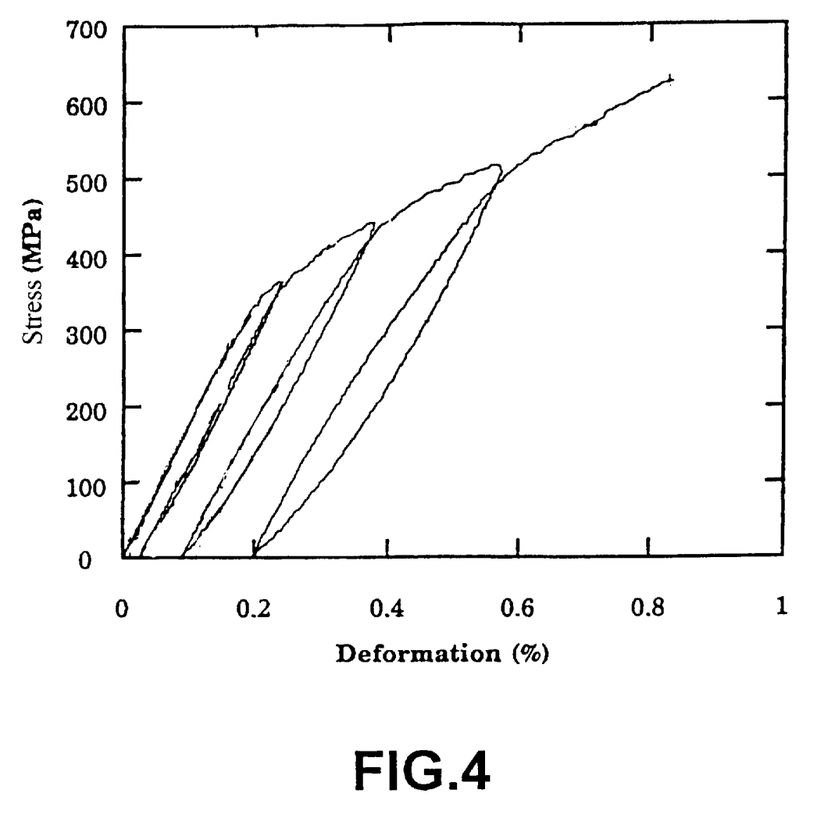
FIG. 4 shows curves illustrating the traction behavior of a sequenced matrix composite material of the invention after aging at temperature in air.

A third traction test was performed after aging at 700° C. in air for 70 h where the densified roving did not have the additional $P_2O_5$ coating. The mechanical traction behavior during a plurality of stretching-relaxation cycles, to rupture, is shown by the curves of FIG. 4.

Finally, aging tests in air at 700° C. were performed on two pieces of roving densified by the sequenced matrix, and subjected to static traction stresses respectively of 230 MPa and 350 MPa. These tests did not lead to the composite material rupturing after 70 h under 230 MPa or after 191 h under 350 MPa. Observation of the surface of the composite material showed cracks that had been healed by a phase that is believed to be boron oxide. Optical microscope observation of a longitudinal section of the material after 70 h of aging did not show any cracking inside the roving. This means that the cracks observed on the surface had not reached the surface of the fibers. At this level of stress, the carbon fibers were therefore completely protected from the oxidizing environment.

EXAMPLE 2

Carbon fiber roving was densified with a sequenced matrix in the same manner as in Example 1, with the exception that the relatively flexible layers of BC were of half the thickness, giving them a total thickness of 0.6 µm. When examined under the microscope, the composite material made in this way showed no network of initial cracking within the matrix.

Curve A in FIG. 2A shows the relationship between relative elongation and force exerted during traction testing performed at ambient temperature to rupture on a piece of roving densified in this way by a sequenced matrix.

EXAMPLE 3

Carbon fiber roving was densified with a sequenced matrix in the same manner as in Example 1, with the exception that the thickness of the relatively flexible layers of BC was doubled, giving them a total thickness of 2.4 µm. When observed under the microscope, the composite material made in this way showed no network of initial cracking within the matrix.

Curve C in FIG. 2A shows the relationship between relative elongation and force exerted during a traction test performed at ambient temperature to rupture on a piece of roving densified in this way by a sequenced matrix.

COMPARATIVE EXAMPLE 1

By way of a comparison, fiber roving of the kind used in Example 1 was densified by a monolithic matrix of silicon carbide after an interphase coating of rough laminar type pyrolytic carbon had been formed on the fibers.

The pyrolytic carbon interphase was formed by pulsed mode chemical vapor infiltration using methane $C_3H_8$ as the precursor gas. Infiltration conditions were as follows:

T=950° C.
P=3 kPa
$D_P$=5 s
$K_D$≈0.5 nm

The number of cycles was selected so as to obtain a thickness 2.4 μm for the interphase coating.

The silicon carbide matrix was formed by pulsed mode chemical vapor infiltration using a gas containing methyltrichlorosilane (MTS) and hydrogen $H_2$ as the reactive species. The infiltration conditions were as follows:

T=950° C.
P=3 kPa
α(MTS)=6
$D_P$=2 s
$K_D$≈1.5 nm

Figure 2B:
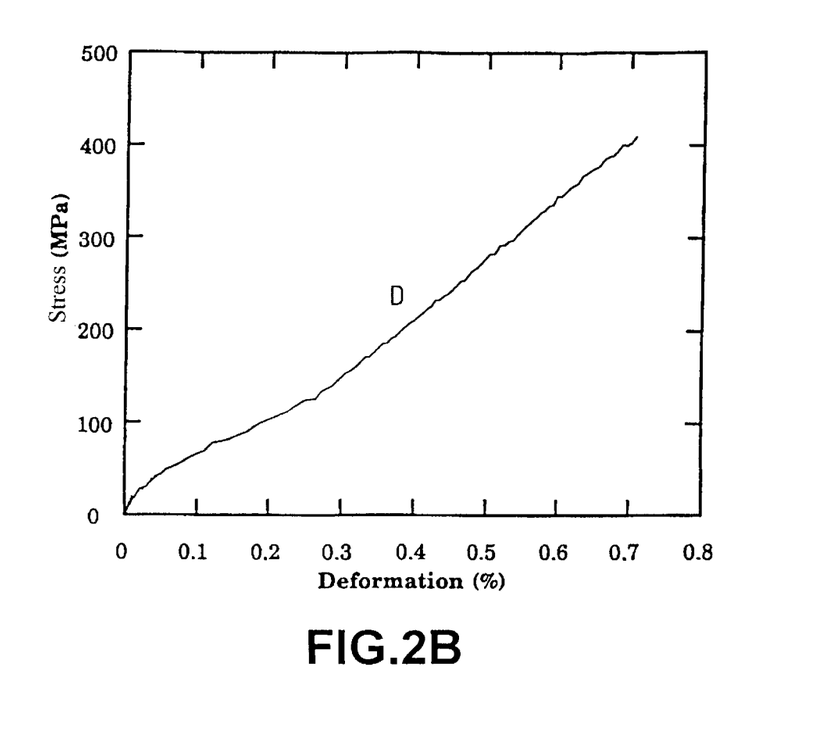

A first traction test at ambient temperature was performed on a piece of roving densified with the SiC matrix. Curve D in FIG. 2B shows the relative elongation that was measured as a function of the traction force exerted, up to rupture which took place at about 405 MPa.

Figure 3B:
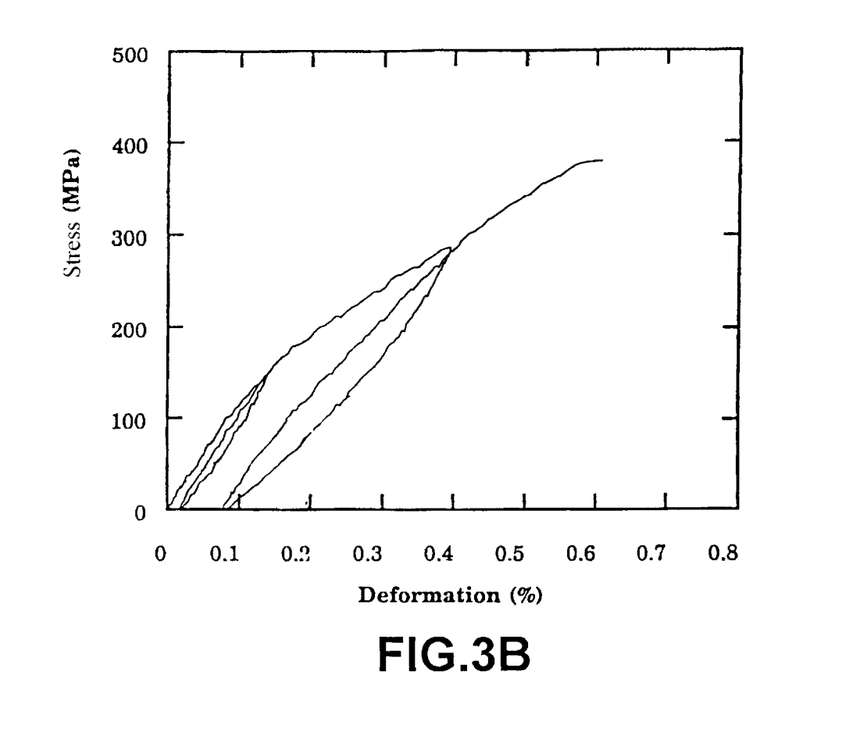

A second traction test was performed at 700° C. in air after application of an outer coating constituted by $P_2O_5$ type glass to provide protection against oxidation while the test was taking place. Curves D in FIG. 3B show the relationship between elongation and stress during a plurality of stretching-relaxation cycles.

Finally, two aging tests in air at 700° C. were performed on two pieces of roving densified with the SiC matrix but not having the additional $P_2O_5$ coating, and subjected to static stresses in traction respectively of 125 MPa and 250 MPa. Rupture was observed after 5 h at 125 MPa and after 1 h at 250 MPa. It can thus be seen that lifetime was much shorter than that of the sequenced matrix composite material of Example 1, in spite of the presence of surface cracking thereon. The difference in lifetime comes from the fact that in the non-sequenced SiC matrix material, the initial network of cracks, made worse by the mechanical stress, rapidly provided the ambient oxygen with a direct path to the fibers.

Interpretation of the Examples and of the Results Shown in FIGS. 2A, 2B, 3A, 3B and 4

FIG. 2B shows that the non-sequenced SiC matrix composite material has non-linear behavior from the beginning of mechanical stress being applied thereto, and this is associated with mechanisms that damage the matrix and the interphase, which mechanisms are initiated from the beginning of the process of making the material. However, FIG. 2A shows that sequenced matrix composite materials with BC crack-deflecting layers have behavior that is initially linear. The stress corresponding to the beginning of non-linearity increases with decreasing total thickness of the BC layers, however rupture is less fragile for a total thickness of 1.2 μm. It appears that the optimum total thickness for the BC layers lies in the range 0.6 microns to 2.4 microns, i.e. the total thickness of the relatively flexible layers lies in the range about 4% to about 20% of the total thickness of the deposited sequences.

FIG. 3B shows that when hot, with the anti-oxidation outer layer, the damaging stage extends to a higher stress level than when cold for the non-sequenced SiC matrix composite material. However the hot behavior of sequenced matrix composite materials differs little from the cold behavior thereof: it is linear initially, and then damaging. Nevertheless, the damaging stage is of much greater extent. The stress and elongation levels achieved at rupture are quite high: about 800 MPa and 1%. It may be observed that stress at rupture is close to that for the fiber roving when not densified.

Finally, FIG. 4 shows that after aging in air, traction behavior is of the same type as that observed at ambient temperature or hot for the sequenced matrix composite material. Nevertheless, the deformation at rupture is greater than during the traction test at ambient temperature without aging.

A remarkable property of the composite material made in accordance with the invention lies in the absence of any initial cracking network that results from the manufacturing process.

Although no kind of reliable scientific explanation for this phenomenon, the Applicant believes that the particular characteristics of the matrix sequencing performed contribute to obtaining this result.

Firstly, it is probable that covering each fiber of the fiber reinforcement individually or essentially individually by at least one matrix sequence including a relatively flexible layer and a relatively rigid layer contributes to making it possible to absorb differential expansion without cracking the rigid layers. The thickness of the first or of each of the first deposited sequences must therefore be relatively small and must take account of the volume fraction of fibers in the fiber reinforcement, i.e. the fraction of the apparent volume of the reinforcement that is actually occupied by the fibers. In general, this thickness is preferably chosen to be less than 1 micron. Although there is no absolute bottom limit, other than one or a few layers of atoms, in practice in order to avoid pointlessly multiplying the number of sequences, a minimum value of about 0.2 microns, or preferably about 0.45 microns may be adopted, for example. It will also be observed that individually coating the fibers amounts to making reinforcement elements of increased thickness. It is therefore possible to use starting fibers of diameter smaller than that which may be required to achieve the desired fiber volume fraction and the desired mechanical characteristics of the reinforcement.

The thicknesses of the matrix sequences formed after the sequence(s) covering the fibers increase either continuously or in steps, with sequences successively covering groups of fibers and then bundles of fibers. This increase in thickness, which can be more marked for the rigid layers than for the flexible layers, does not affect the overall ability of the matrix to absorb differential expansion between the components of the composite material but it does avoid pointlessly multiplying the number of sequences, where such multiplication would give rise to a considerable increase in the time and the cost involved in making the material. Progressively increasing thickness in a manner that is more marked for the relatively rigid ceramic layers also makes it possible to ensure that the matrix retains its essentially ceramic character. Thus, the thicknesses of the successively-formed sequences can increase from a value lying in the range about 0.2 microns to 1 micron to a value that is greater than 2 microns, while in the successive sequences, the percentage S constituted by the thickness of the relatively flexible layer compared with the total thickness of the sequence can decrease from a value lying in the range about 10% to about 35% to a value lying in the range about 3% to about 20%.

The above examples show that boron-doped carbon, BC, is suitable for making the relatively flexible layers because of its anisotropic character and its capacity for elastic deformation in shear and transversely. Boron-doped carbon, BC, also has the advantage of withstanding oxidation better. Nevertheless, other materials, not necessarily having self-healing properties, may also be suitable, for example pyrolytic carbon, in particular of the rough laminar type, and boron nitride, BN.

The relatively rigid layers are made of a ceramic material capable of being deposited by chemical vapor infiltration, e.g. a carbide, a boride, a silicide, or any other ceramic capable of enabling cracks to be healed as they appear.

The relatively flexible layers of the various sequences in the matrix may all be made of the same material, as in Examples 1 to 3, or else different materials may be selected, optionally in alternation in the successive sequences.

Similarly, the relatively rigid layers may all be made of the same material, or else different materials may be selected, as in Examples 1 to 3, optionally in alternation in successive sequences.

What is claimed is:

1. A method of making a thermostructural composite material comprising carbon or carbon-coated fiber reinforcement and having increased ability to withstand oxidation, in which method a matrix is formed by chemical vapor infiltration within the fiber reinforcement at least in part in a sequenced manner, alternating formation of a layer of a relatively flexible anisotropic material capable of deflecting any cracks reaching it, and a layer of a relatively rigid ceramic material, said relatively flexible anisotropic material having a rigidity less than that of the relatively rigid ceramic material, the method being characterized in that:

each of a plurality of elementary sequences of the matrix comprising a relatively flexible layer of the relatively flexible anisotropic material and a relatively rigid ceramic layer, and wherein each of the plurality of elementary sequences is formed with a thickness that increases starting from the reinforcing fibers as preparation of the matrix progresses, with the total thickness of at least the elementary matrix sequence deposited first on the fibers being selected to be sufficiently small to cover the fibers in essentially individual manner; and the relatively flexible layers of the relatively flexible anisotropic material are made of one or more anisotropic materials having sufficient capacity for elastic deformation in shear and transversely, and, while conserving a mainly ceramic character for the matrix, the thickness of the relatively flexible layers is selected to be large enough for them to be capable of absorbing differential expansion of the components of the material while it is being made, without inducing therein the existence of an initial network of cracks.

2. A method according to claim 1, characterized in that the relatively flexible layers of the relatively flexible anisotropic material are made so as to constitute a total thickness that lies in the range about 4% to about 20% of the total thickness of the layers of the sequenced matrix.

3. A method according to claim 1, characterized in that, in the elementary sequences, the percentage S occupied by the thickness of the relatively flexible layer of the relatively flexible anisotropic material compared with the total thickness of the sequence decreases from a maximum value Smax in the elementary sequence formed first on the fibers, to a minimum value Smin in the elementary sequence of the matrix that is formed last.

4. A method according to claim 3, characterized in that Smax lies in the range about 10% to about 35%.

5. A method according to claim 3, characterized in that Smin lies in the range about 3% to about 20%.

6. A method according to claim 1, characterized in that the thickness of at least the elementary sequence that is formed first on the fibers lies in the range about 0.2 microns to 1 micron.

7. A method according to claim 1, characterized in that the thickness of at least the elementary sequence of the matrix formed last is at least 2 microns.

8. A method according to claim 1, characterized in that the relatively flexible layers of the relatively flexible anisotropic material are made of at least one material selected from pyrolytic carbon, boron nitride BN, and boron-doped carbon BC.

9. A method according to claim 1, characterized in that the relatively flexible layers of the relatively flexible anisotropic material are made in at least one material suitable for forming a self-healing compound under the effect of oxidation.

10. A method according to claim 1, characterized in that the relatively rigid ceramic layers are made out of at least one material selected from carbide, silicides, and borides.

11. A method according to claim 10, characterized in that at least some of the relatively rigid layers are made of a boron carbide or silicon carbide.

12. A method according to claim 1, characterized in that each layer constituting the sequenced matrix is formed by pulsed mode chemical vapor infiltration.

13. A thermostructural composite material having carbon or carbon-coated fiber reinforcement and a matrix that is at least partially sequenced with alternating layers of relatively flexible anisotropic material capable of deflecting any cracks that reach them, and layers of relatively rigid ceramic material, said relatively flexible material having a rigidity less than that of the relatively rigid ceramic material, the composite material being characterized in that:

each of a plurality of elementary sequences of the matrix comprises a relatively flexible layer of the relatively flexible anisotropic material and a relatively rigid ceramic layer, each of the plurality of elementary sequences having a thickness that increases going from the elementary sequence closest to the fibers to the elementary sequence furthest from the fibers, with at least the elementary sequence closest to the fibers coating them in substantially individual manner; and the thickness of the relatively flexible layers of the relatively flexible anisotropic material, and the anisotropic character and the capacity for elastic deformation in shear and transversely of the material(s) constituting said layers are such that the matrix of the composite material is free from cracking, at least at the end of the process of building up the composite material.

14. A material according to claim 13, characterized in that the percentage of the total thickness of the relatively flexible layers the relatively flexible anisotropic material compared with the total thickness of the layers of sequenced material lies in the range about 4% to about 20%.

15. A material according to claim 13, characterized in that in the elementary sequences, the percentage S represented by the thickness of the relatively flexible layer of the relatively flexible anisotropic material relative to the total thickness of the sequence decreases from a maximum value Smax in the elementary sequence formed first on the fibers, to a minimum value Smin in the elementary sequence of the matrix that is formed last.

16. A material according to claim 15, characterized in that Smax lies in the range about 10% to about 35%.

17. A material according to claim 15 or 16, characterized in that Smin lies in the range about 3% to about 20%.

18. A material according to claim 13, characterized in that the thickness of at least the elementary sequence of the matrix that is closest to the fibers lies in the range 0.2 microns to 1 micron.

19. A material according to claim 13, characterized in that the thickness of at least the elementary sequence of the matrix that is furthest from the fibers is not less than 2 microns.

20. A material according to claim 13, characterized in that the relatively flexible layers of the relatively flexible anisotropic material are made out of at least one material selected from pyrolytic carbon, boron nitride BN, and boron-doped carbon BC.

21. A material according to claim 13, characterized in that the relatively flexible layers of the relatively flexible anisotropic material are made out of at least one material suitable for forming a compound that is self-healing under the effect of oxidation.

22. A material according to claim 13, characterized in that the relatively rigid ceramic layers are made out of at least one material selected from carbides, silicides, and borides.

23. A material according to claim 13, characterized in that at least some of the relatively rigid layers are made of a boron carbide or silicon carbide.

24. A method according to claim 2, characterized in that:
in the elementary sequences, the percentage S occupied by the thickness of the relatively flexible layer of the relatively flexible anisotropic material compared with the total thickness of the sequence decreases from a maximum value Smax in the elementary sequence formed first on the fibers, to a minimum value Smin in the elementary sequence of the matrix that is formed last;

Smax lies in the range about 10% to about 35%;

Smin lies in the range about 3% to about 20%;

the relatively flexible layers of the relatively flexible anisotropic material are made of at least one material selected from pyrolytic carbon, boron nitride BN, and boron-doped carbon BC;

the relatively flexible layers of the relatively flexible anisotropic material are made in at least one material suitable for forming a self-healing compound under the effect of oxidation;

the relatively rigid ceramic layers are made out of at least one material selected from carbide, silicides, and borides;

the relatively rigid layers are made of a boron carbide or silicon carbide; and each layer constituting the sequenced matrix is formed by pulsed mode chemical vapor infiltration.

25. A method according to claim 24, characterized in that the thickness of at least the elementary sequence that is formed first on the fibers lies in the range about 0.2 microns to 1 micron.

26. A method according to claim 24, characterized in that the thickness of at least the elementary sequence of the matrix formed last is at least 2 microns.

27. A material according to claim 14, characterized in that:

in the elementary sequences, the percentage S represented by the thickness of the relatively flexible layer of the relatively flexible anisotropic material relative to the total thickness of the sequence decreases from a maximum value Smax in the elementary sequence formed first on the fibers, to a minimum value Smin in the elementary sequence of the matrix that is formed last;

Smax lies in the range about 10% to about 35%;

Smin lies in the range about 3% to about 20%;

the thickness of at least the elementary sequence of the matrix that is closest to the fibers lies in the range 0.2 microns to 1 micron;

the thickness of at least the elementary sequence of the matrix that is furthest from the fibers is not less than 2 microns;

the relatively flexible layers of the relatively flexible anisotropic material are made out of at least one material selected from pyrolytic carbon, boron nitride BN, and boron-doped carbon BC;

the relatively flexible layers of the relatively flexible anisotropic material are made out of at least one material suitable for forming a compound that is self-healing under the effect of oxidation;

the relatively rigid ceramic layers are made out of at least one material selected from carbides, silicides, and borides; and at least some of the relatively rigid layers are made of a boron carbide or silicon carbide.

* * * * *